United States Patent Office 2,971,406
Patented Feb. 14, 1961

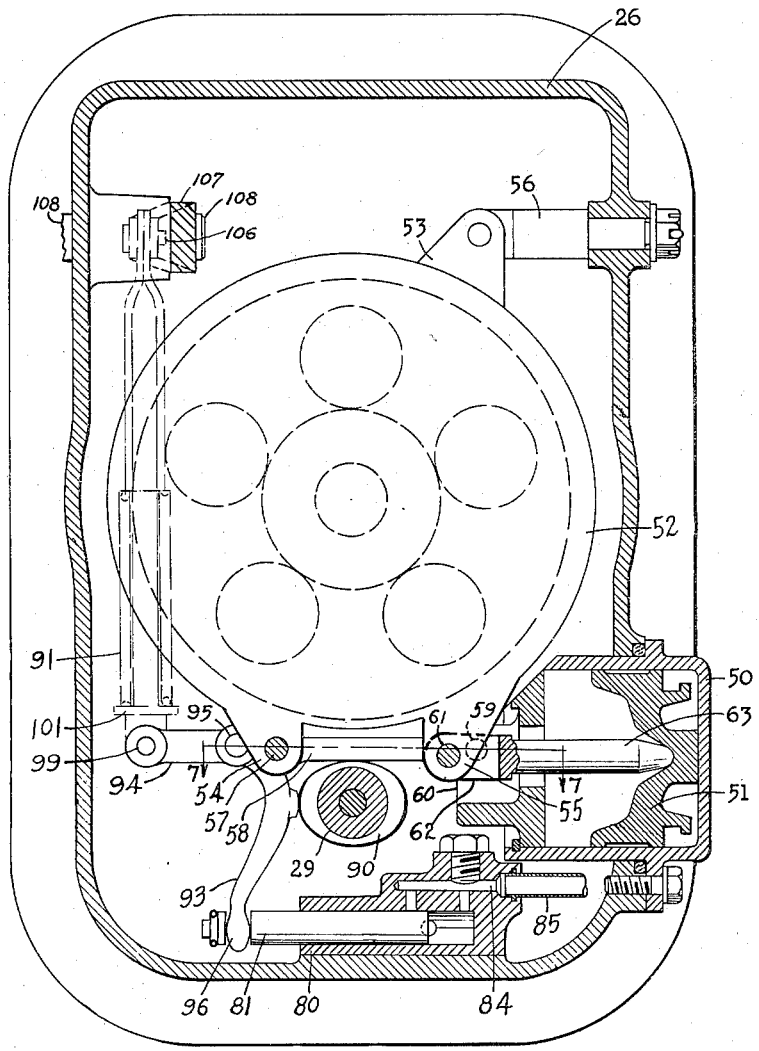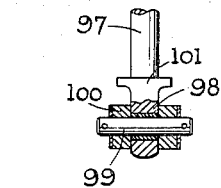

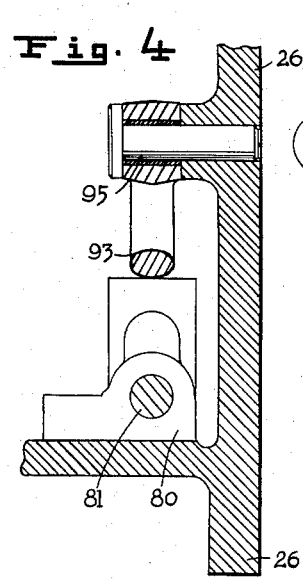
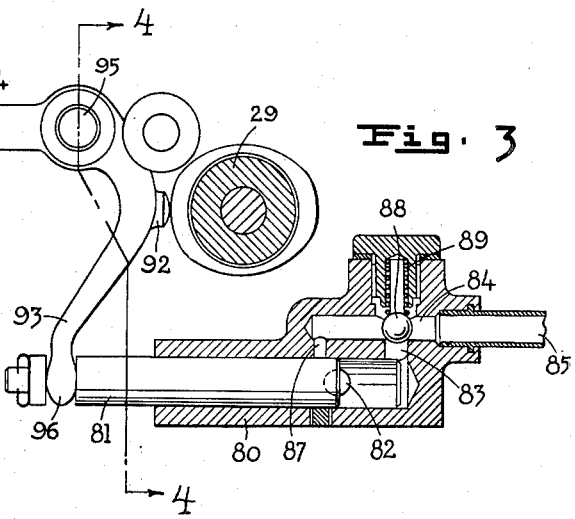
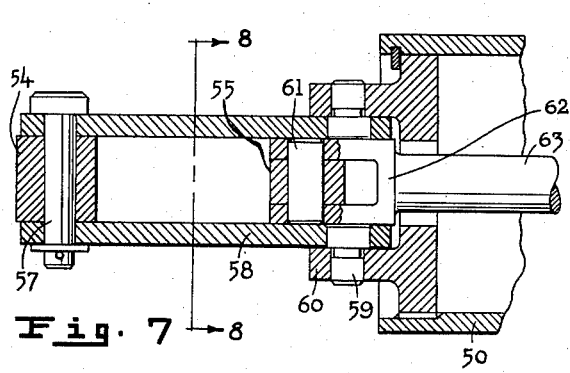
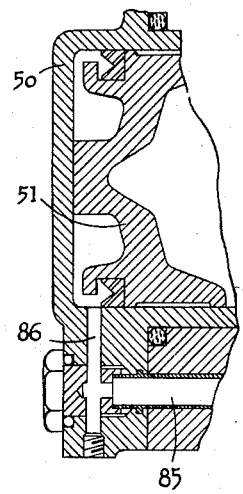
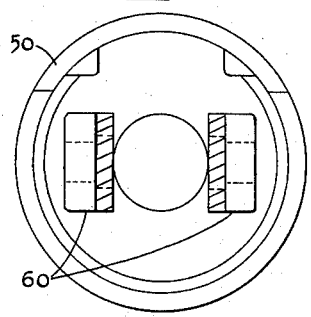
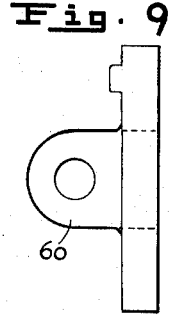

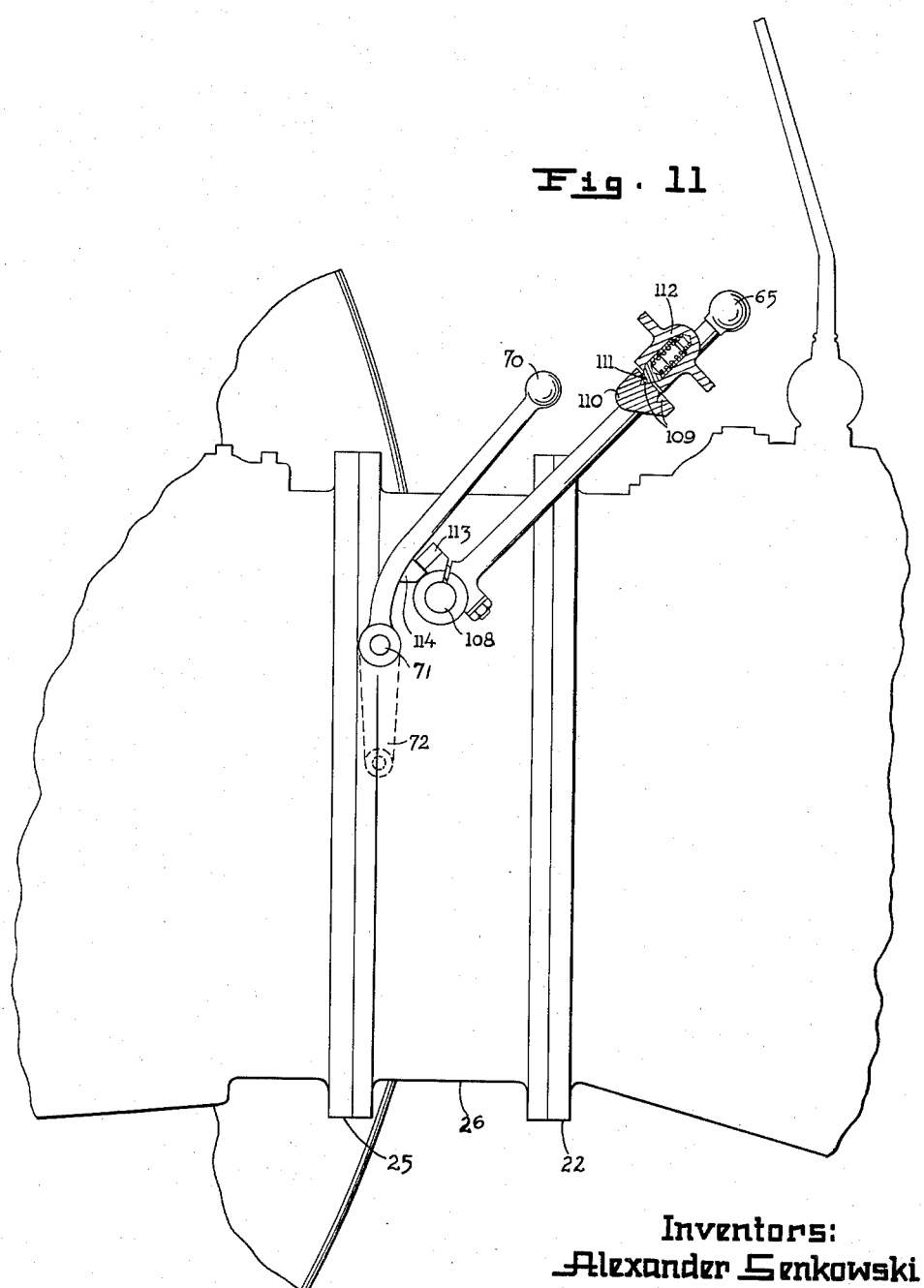

2,971,406

EPICYCLIC TRANSMISSION AND CONTROL MECHANISM THEREFOR

Alexander Senkowski, Coventry, and Arthur E. Lynes, Sutton Coldfield, England, assignors to Massey-Ferguson Inc., a corporation of Maryland Filed Jan. 17, 1955, Ser. No. 482,304

Claims priority, application Great Britain Jan. 18, 1954

9 Claims. (Cl. 74—785)

This invention relates to power transmissions and control mechanisms therefor.

Conventional tractors have a change speed gear box connected to the internal combustion engine through a clutch which is controlled by the operator. The ground wheels are driven from the change speed unit, through the differential at selective speeds. It is necessary, under certain operating conditions, to be able to maintain the power-take-off shaft in continuous operation regardless of the tractor ground speed and certain aspects of this invention find particular utility in these "indpendent" or "live" power-take-off type transmissions.

An object of this invention is to provide an improved epicyclic gear unit interposed between the change-speed gearing and the differential gear which is selectively settable to act either as a direct positive drive, a reduction gear giving a complete set of extra low speeds, or as an extra clutch behind the change-speed gearing and forward of the differential for independent power-take-off work; said unit being compact, economical to manufacture, highly efficient in operation and easily insertable between existing component parts of a conventional tractor.

Another object of this invention is to provide a hydraulic actuator, for an epicyclic gear unit of the above type, having a pump means and a novel actuating mechanism therefor; novel control means for said pump are also provided.

Other objects and advantages of this invention will become more apparent as this disclosure progresses, reference being had to the accompanying drawings, in which:

Fig. 2 is a transverse elevational section taken on line 2—2 of Fig. 1.

Fig. 3 is a sectional view, on an enlarged scale, of the pump shown in Fig. 2.

Fig. 4 is a sectional view of the pump taken on line 4—4 of Fig. 3.

Fig. 5 is a sectional, elevational view of the mechanism for controlling the pump shown in phantom in Fig. 2.

Fig. 6 is a fragmentary view, partially in section, taken generally on the line 6—6 of Fig. 5.

Fig. 7 is a sectional plan view, on an enlarged scale, taken generally on line 7—7 of Fig. 2, showing the cylinder-and-piston actuator.

Fig. 8 is an elevational end view taken on line 8—8 of Fig. 7, with certain parts removed.

Fig. 9 is a side elevational view of the cylinder head.

Fig. 10 is a fragmentary sectional view of the cylinder and piston viewed from a direction generally opposite to that of Fig. 2. The view is taken on a transverse plane which is neither horizontally nor vertically disposed.

Fig. 11 is an elevational side view, partially in section, showing two interlocked hand levers for controlling the operation of the epicyclic gear.

Figure 1:
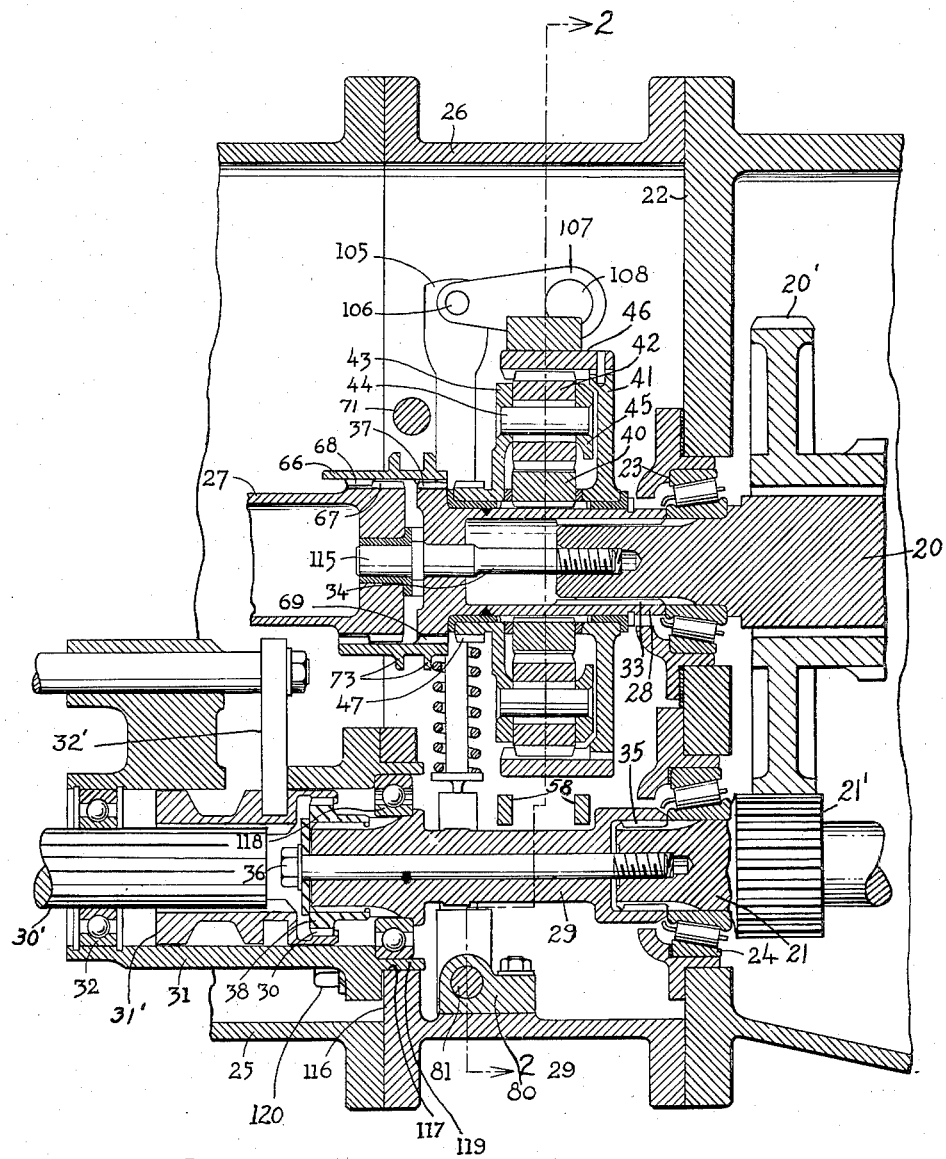
Fig. 1 is a longitudinal elevational sectional view of the epicyclic unit and associated parts of the tractor casing.

A particular preferred embodiment of this invention has been shown and described in detail but there is no intention to limit the invention to such embodiment, but rather, the appended claims are intended to cover all modifications within the spirit and scope of the invention as defined in the claims.

The invention has been shown as incorporated in the well known "Ferguson" tractor having an output shaft 20 and a layshaft 21, both of the change-speed-gearing, journalled in the bearings 23, 24 respectively, of the change-speed-gear-casing 22. Only gears 20' and 21' of the conventional change-speed gearing are shown. The flanged front end of the rear axle, or differential, casing 25 is ordinarily secured to the rear flange of casing 22 by a series of nuts and bolts (not shown). However, in accordance with this invention, a casing 26 is inserted therebetween and contains the epicyclic unit to be described. This epicyclic gear unit casing 26 is secured by its front flange to the rear flange of casing 22 by means of bolts (not shown) extending through apertures in the flanges. The rear flange of casing 26 and the front flange of casing 25 are similarly secured. An extension shaft 28 is interposed co-axially between the output shaft 20 and the modified transmission shaft 27. The shaft 28 is splined at 33 to output shaft 20 and secured to it by screw pin 34 and has a ring of clutch teeth 37 around the periphery of its rearward end. Another short extension shaft 29 is splined at 35 to the layshaft 21 and has a ring of clutch teeth 30 on a ring 38 splined and secured at the other end of shaft 29 for connection with the power-take-off shaft 30'. A long bolt 36 secures shaft 29 to layshaft 21. A bracket 31 is provided on casing 26 and extends within casing 25 and has a bearing 32 in which is mounted the power-take-off (P.T.O.) shaft 30'. The P.T.O. shaft 30' extends to and projects at the rear of the tractor body for attachment to implements associated with the tractor. The connection with the P.T.O. shaft 30' is effected through the medium of a dog clutch 31', slidable on the splined shaft 30', which may be engaged or disengaged manually by the shifter yoke 32' in the well known manner.

With reference to the epicyclic unit, the speed-reducing epicyclic gear itself will now be described. The elements of this gear are an externally toothed gearwheel 40 which is the "sunwheel" or "sungear," an internally toothed gearwheel 41 which is the "annulus," a set of pinions 42 which are the "planets" and a wheel 43 which is the "planet-carrier." The sungear 40 is splined on the extension shaft 28 so as to rotate with the output shaft 20 whereas both the annulus 41 and the planet-carrier 43 are journalled on the extension shaft 28 so as to be freely rotatable on it. The planets 42 are journalled on bearing pins 44 secured between the planet-carrier 43 and a supporting ring 45. The annulus has a cylindrical brake surface 46 around its periphery. The planet-carrier 43 has a ring of clutch-teeth 47 around the periphery of its rearward end, hereinafter more fully described.

The annulus surface 46 is embraced by a friction-lined brake 52 of known construction and therefore only diagrammatically illustrated. This brake is applicable to the annulus 41 by the action of an hydraulic cylinder-and-piston actuator 50, 51 (Figs. 2 and 10). This brake is a dual-band contrivance 52 having a first anchorage lug 53 (see Fig. 2), a second anchorage lug 54 and an actuating lug 55. The lug 53 is pivotally connected to a stationary anchorage pin 56 on the epicyclic-unit casing 26. The lug 54 is pivotally connected to a pin 57 carried by a double link 58 (see Fig. 7) extending from fixed reaction pins 59, which are secured between lugs 60 on the cylinder 50 of the actuator. Thus the portion of the band 52 which is secured to pin 57 is fixed. The lug 55 is pivotally connected to a pin 61 on a fork 62 at the end of the rod 63 of the actuator piston 51. Thus that portion of the band 52 which is secured to piston rod 63 is movable therewith. It will be obvious that when hydraulic liquid is forced under pressure into the actuator cylinder 50, the piston 51 will force the actuating lug 55 towards the left, as viewed in Fig. 2, and therefore will draw the brake 52 into braking engagement with the annulus surface 46 against the reaction of the fixed pin 59. The hydraulic actuator 50, 51 must be capable of actuating the brake to hold the annulus rigidly locked. The actuator is operable to apply and relieve the brake under control of the tractor by means of an external hand lever 65 (Fig. 11) through mechanism hereinafter described.

Clutch means are provided for selectively engaging the transmission shaft 27 with either the output shaft 20 or the carrier 43. The planet-carrier 43 and its clutch-teeth 47, are formed as one of three co-axial juxtaposed clutch-toothed rings; the other two are the ring of teeth 37 on the extension shaft 28 and a ring of teeth 67 on the front end of the modified transmission shaft 27. These three rings of teeth co-operate with an axially movable collar 66 formed internally with two spaced rings of clutch teeth 68 and 69 designed to mate with the rings of teeth 37, 47 and 67. This clutch collar 66 is movable under the control of the tractor driver by means of a second external hand lever 70 (Fig. 11) through an appropriate mechanism. This mechanism comprises a turnable shaft 71 to which the lever 70 is secured and a fork 72 on the shaft, this fork engaging an annular groove between rings 73 on the clutch collar 66. The arrangement is such that the driver can move the clutch collar 66 into either of two positions, namely: a first position shown in Figs. 1 and 11 in which the transmission shaft 27 is clutched through the teeth 67, 68 and 69, 37 to the extension shaft 28 and therefore is positively connected therewith for direct drive by the output shaft 20; a second position in which the transmission shaft 27 is clutched through the teeth 67, 68 and 69, 47 to the planet-carrier 43 and therefore is connected through the epicyclic to the output shaft 20. In this second position, two alternative effects are obtainable, namely:

(1) With the brake applied to lock the annulus 41, the epicyclic gear is an active drive-transmitting unit, which introduces an additional speed-reduction stage between the change-speed gear and the gear ground wheels, so that a complete additional set of extra low speeds including reverse, is made available.

(2) With the brake relieved from the annulus 41, the epicyclic gear is inoperative and therefore has the same effect as an opened friction clutch. Accordingly, the driver can maintain an uninterrupted drive through the power-take-off shaft by keeping closed the conventional main clutch between the engine shaft and the change-speed gearing and by using the epicyclic brake as a transmission clutch.

It will also be manifest that, when the epicyclic gear is brought into operation as an extra speed-reduction stage, the brake by virtue of its ability to slip will function as a safety device in the overall transmission gearing.

The pump means interposed between the hand lever 65 and the hydraulic actuator 50, 51 includes an hydraulic cylinder-and-plunger pump 80, 81. The cylinder 80 is immersed in oil within the epicyclic unit casing 26. The cylinder is formed with an inlet port 82, a substantial length of cylindrical space being provided between this port 82 and the closed end of the cylinder. An outlet port 83 is formed at the cylinder end. The port 83 leads into a passage 84 to which a delivery pipe 85 is connected, this pipe leading to a supply port 86 at the closed end of the actuator cylinder 50 (see Fig. 10). The passage 84 also leads back to a relief port 87 beyond the inlet port 82. The outlet port 83 has a non-return valve 88; but the inlet port 82 is not valved at all. The valve 88 is a ball which is pressed by a spring 89 to close the port 83. It will be manifest that, if the pump plunger 81 is moved outwards—i.e. to the left as viewed in Fig. 3—a depression is created which induces a rapid inflow of oil, as the inlet port is uncovered, from the casing 26 into the cylinder 80. Thus, although the inlet port is uncovered for only a short portion of the stroke, there is adequate filling of the cylinder. The delivery stroke commences as soon as the port 82 is covered and will end at a point the position of which is variable and depends on the spring pressure and the hydraulic back pressure. When the plunger 81 is forced inwards, the oil in the cylinder 80 will be at first trapped between the inlet port 82 and the cylinder end, after which as the oil pressure rises, the trapped oil will be forced through the outlet port 83 and past the valve 88 into the pipe 85 and thence by way of the supply port 86 into the actuator cylinder 50. Accordingly, if the pump plunger 81 is reciprocated, during successive instrokes a supply of pressure oil will be forced into the cylinder 50 and accordingly the actuator piston 51 will be displaced outwards to tighten the dual brake band 52 around the annulus surface 46; and eventually the annulus will become locked.

It will also be manifest that if the pump plunger 81 is withdrawn sufficiently to uncover the relief port 87, the oil in the actuator cylinder 50 will be free to flow back past the outlet valve 88 and by way of the inlet port 82 at the sump of casing 26; and so the pressure in the cylinder 50 will fall towards zero.

Novel mechanism is provided for actuating the pump. The suction stroke is supplied to the pump plunger through this mechanism by a rotary cam 90 formed on extension shaft 29 which is continuously rotated by lay-shaft 21 as long as the engine is running and the main clutch closed. In this particular embodiment the cam 90 is shown as comprising two opposed humps but one hump may be used for a slower delivery rate. This power operated or driven cam 90 co-operates with a follower 92 on one arm 93 of a bell-crank lever 93, 94 which has a fulcrum shaft 95. The arm 93 is forked at 96 and there engages the plunger 81. The pumping stroke is also supplied to the plunger 81 by this mechanism which includes a spring 91 placed upon a central rod 97 (see Fig. 5) the foot 98 of which is pivotally connected by a pin 99 to a fork 100 (see also Fig. 6) on the end of the bell-crank arm 94. The foot 98 has a collar 101 on which the spring is seated. A sleeve 102 slidably fitted on the rod 97 is seated upon the top of the spring 89. The rod 97 and sleeve 102 are telescopically related, being slidable each relatively to the other between the limits defined by a lost-motion device consisting of a cross pin 103 extending through the rod and longitudinal slots 104 in the sleeve, through which slots both ends of the pin extend. The sleeve 102 has a head 105 which is pivotally connected by a pin 106 to the forked end of an arm 107 on a turnable shaft 108 to which the adjustable control means, in the form of lever 65, is secured (see Fig. 11). The shaft 108 is adjustable into either of two available positions, namely a "brake off" position and a "brake on" position, respectively defined by spaced notches 109 in a projection 110 on the hand lever, these notches being arranged to co-operate with a spring-plunger 111 on a stationary fitting 112.

The arrangement is such that during a succession of suction and pumping strokes there is eventually generated in the actuator 50, 51 an hydraulic pressure balancing the spring stress following which the work of pumping automatically ceases. Accordingly, when the maximum hydraulic pressure is attained, at which stage the brake 52 will be fully applied and the epicyclic gear will be in, or ready for, full effectiveness as a speed-reducing intermediary in the transmission mechanism, there will be no wastage on the pump of the engine-generated power.

In the "brake-off" position of the hand lever 65, in which it is shown in Fig. 11, the arm 107 holds the sleeve 102 raised sufficiently to take up the lost-motion in the device 103, 104 and to raise the rod 97 into a position in which it holds the bell-crank lever 93, 94 with the follower 92 clear of the cam 90. Thus, when the brake is "off," the pump is inoperative so that no work is wasted in pumping oil and there is no wear in the pump operating parts.

It will be manifest that the pump, involving as it does the use of only one valve, is of especially simple and inexpensive construction.

When the hand lever 65 is shifted towards the left, as viewed in Fig. 11, into the "brake on" position, the telescopic parts 97, 102 are moved downwards and cause the bell-crank lever 93, 94 to turn. The sleeve 102 eventually moves relative to the rod 97, by virtue of the lost-motion connection 103, 104, and therefore compresses the spring 91, so that the follower 92 is held against the cam 90. That is to say, the spring 91 acts through the lever 93, 94 to urge the pump plunger 81 to perform a pumping stroke. The cam positively forces the plunger to return and thus perform a suction stroke. In the continued rotation of the layshaft 21, the pump plunger is reciprocated, each pumping stroke being by the spring and each return stroke by the cam. As the oil pressure builds up beyond the pump outlet valve 88, and therefore in the brake actuator cylinder 50, the length of each stroke gradually decreases until, when the oil pressure balances the spring pressure, the plunger reciprocates idly from side to side of the inlet port, merely "breathing" oil to and from the sump of casing 26. The brake 52 is by then held fully "on" by the actuator 50, 51 and the epicyclic-gear annulus 41 is locked.

Seeing that the magnitude of the oil pressure is dependent upon that of the spring pressure the driver can bring the epicyclic gear into action gradually. Moreover, the mechanism can be devised to give an oil pressure such that shock or other excessive load will cause slipping of the brake, so that breakages in the gear and in the transmission generally will be avoided.

When next the hand lever 65 is turned into the "brake off" position, the telescopic parts 97, 102 are raised and the pump plunger 81 is withdrawn to uncover the release port 87. Thus, as already explained, the oil pressure in the actuator cylinder 50 quickly falls towards zero and the brake 52 is released.

Means are provided for inter-locking the two hand levers 65 and 70 as a safety measure. As Fig. 11 shows, the inter-locking means comprise two projections 113 and 114 on the hand levers 65 and 70 respectively. In Fig. 11, the lever 65 is in the "brake off" position, so that the epicyclic gear is idle, and the lever 70 is positioned to clutch the output shaft 20 through the extension shaft 28 to the transmission shaft 27 (see also Fig. 1) to give a direct drive. The projections 113, 114 are so devised that in the position under consideration the hand lever 65 cannot be moved to apply the brake 52. That is to say, so long as the co-axial shafts 27, 28 and 20 are clutched directly together, the epicyclic gear cannot be set as a torque-transmitting medium. This arrangement is desirable because the driver can freely turn the hand lever 70 to declutch the transmission shaft from the extension shaft 28 and instead clutch it to the planet-carrier 43, which therefore for the time being should be a mere idler, not a torque transmitter. Incidentally, in the example shown in Fig. 1, the clutch teeth 69 of the sliding collar 66 can bridge the clutch teeth 37 and 47 on the extension shaft 28 and planet-carrier 43, respectively. Therefore, in the example it is a practical necessity to prevent clutching the teeth 69 with the teeth 37 while the epicyclic gear has its annulus braked, for then the planet-carrier is positively driven.

After turning the hand lever 70, the driver can turn the hand lever 65 to the "brake on" position, in which the annulus is braked or fully locked, so that driving torque is transmitted through the planet-carrier 43 but at reduced speed to the transmission shaft 27. In this position of both hand levers 65, 70, the projections 113, 114 again inter-lock, the action being such that the lever 70 cannot be moved to clutch the shafts 27, 28 and 20 together until after the lever 65 is returned to the "brake off" position.

With reference now to the epicyclic unit as a whole, including its casing 26, this unit adds somewhat to the overall length of the tractor. It will now be apparent however, that the fitment of such a unit to an existing tractor is a simple operation. As regards the front side of the unit, the front ends of the extension shaft 28 and 29 make an easy sliding fit with the rear ends of the output shaft 20 and layshaft 21, respectively, to which shafts as aforesaid they are secured in a simple manner by means of the single screw pins 34 and 36 respectively.

As regards the rear side of the epicyclic unit, the pin 34 has a terminal spigot 115 (see Fig. 1) which serves as a journal for the front end of the transmission shaft 27. Moreover, the casing 26 has a rear end wall 116, which extends above the level of the power-take-off shaft. The wall 116 has a large hole 117. The extension shaft 29 is fitted at its rear end with a ball bearing 118 which is positioned in the hole 117 but is substantially smaller in diametral size, so as to leave an annular cap between the circumferences of the bearing 118 and the hole 117. The parts within the front end of the transmission casing 25 make an easy sliding fit with the complemental parts at the rear side of the unit casing 26, when the casings 25 and 26 are being flange-jointed together. That is to say, the transmission shaft 27 slides upon the spigot 115, and the collar 66 with its front ring of clutch teeth 69 slides upon the clutch-toothed extension shaft 28. Moreover, the already mentioned bracket 31 which supports the front end of the power-take-off shaft has an annular spigot 119 which fits into the annular gap surrounding the bearing 118. The bracket 31 is finally secured by set screws 120 to the wall 116.

Having thus shown and described this invention, what is desired to be secured by Letters Patent is:

1. In combination with a tractor having change speed gearing comprising an output shaft and a layshaft and also having a transmission shaft coaxially disposed with said output shaft; an epicyclic gear unit for said tractor disposed between said output shaft and said transmission shaft comprising, a first extension shaft detachably secured to said output shaft, a sungear secured to said extension shaft, an annular gear rotatably mounted on said extension shaft and having a brake surface, a planet-carrier rotatably mounted on said extension shaft and having planet gears rotatably secured thereto for operative engagement with said annular gear and said sungear, clutch means for selectively engaging said transmission shaft with said first extension shaft or with said carrier, brake means adapted to be engageable with said brake surface and having a fixed portion and a movable portion; a cylinder secured within said tractor having a piston reciprocable therein, said piston having a rod connected therewith and operatively connected with said movable brake portion, fluid pump means having fluid communication with said cylinder for moving said piston and its associated movable brake portion into locking position, a second extension shaft detachably secured to said layshaft for rotation therewith and having a cam surface; mechanism for actuating said pump means including a yieldable means for supplying a pumping stroke and also including a lost-motion connection, said cam surface engaging said mechanism for imparting a suction stroke to said pump; adjustable control means for selectively placing said mechanism in an operative or inoperative position.

2. A device as defined in claim 1 further characterized in that said adjustable control means and said clutch means have interlockable projections so constructed and arranged so that said brake means cannot be engaged with said brake surface while said transmission shaft is engaged with said first extension shaft.

3. In combination with a tractor having a change-speed gear casing with an output shaft and a layshaft extending rearwardly therefrom, and also having a differential casing with a transmission shaft and a power-take-off shaft extending forwardly therein, the improvement comprising; an epicyclic gear unit casing secured between said casings and operatively connecting them together, a first extension shaft rotatably mounted with said unit casing and detachably secured to said output shaft for rotation therewith, a sungear secured to said first extension shaft, an annular gear rotatably mounted on said extension shaft and having a brake surface around its periphery, a planet carrier also rotatably mounted on said extension shaft and having a plurality of planet gears rotatably secured thereto for engagement with said sungear and said annular gear, clutch means for selectively engaging said transmission shaft with said extension shaft or with said carrier, brake means adapted to be engageable with said brake surface, a cylinder secured to said unit casing and having a piston reciprocable therein, said piston having a rod connected to said brake means for actuating the latter, fluid pump means secured to said unit casing and having fluid communication with said cylinder for moving said piston into brake-locking position, a second extension shaft rotatably mounted within said unit casing and detachably secured to said layshaft and having a cam surface thereon, mechanism mounted within said unit casing for actuating said pump means including a yieldable means for supplying a pumping stroke and also including a lost motion connection, said cam surface engaging said mechanism for imparting a suction stroke to said pump, adjustable control mechanism mounted on said unit casing for selectively placing said mechanism in an operative or inoperative position, a bracket secured to said unit casing for rotatably supporting said second extension shaft, a power-take-off shaft rotatably mounted within said bracket, clutch mechanism adapted to selectively engage or disengage said power-take-off shaft and said second extension shaft.

4. The device as defined in claim 3 further characterized in that said adjustable control means and said clutch means have interlockable projections so constructed and arranged so that said brake means cannot be engaged with said brake surface while said transmission shaft is engaged with said first extension shaft.

5. In combination with a tractor having a change-speed gear casing with an output shaft and a layshaft extending rearwardly therefrom, and also having a differential casing with a transmission shaft and a power-take-off shaft extending forwardly therein, the improvement comprising; an epicyclic gear unit casing secured between said casings and operatively connecting them together, an epicyclic gear unit mounted within said unit casing and adapted to detachably engage said output shaft, clutch means supported in said unit for selectively engaging said transmission shaft with said gear unit or directly with said output shaft, brake means engageable with said gear unit, a cylinder and piston actuator mounted within said unit casing, said piston connected with said brake means, pump means secured to said unit casing and having fluid communication with said cylinder, an extension shaft detachably secured at one end with said layshaft and having a cam surface thereon, mechanism mounted within said unit casing for actuating said pump means including a yieldable means for supplying a pumping stroke and also including a lost motion connection, said cam surface engaging said mechanism for imparting a suction stroke to said pump, adjustable control mechanism mounted on said unit casing for selectively placing said mechanism in an operative or inoperative position, a bracket secured to said unit casing for rotatably supporting said extension shaft, a power-take-off shaft rotatably mounted within said bracket, clutch mechanism adapted to selectively engage or disengage said power-take-off shaft and said extension shaft.

6. In combination with a tractor having change speed gearing comprising an output shaft and a lay shaft and also having a transmission shaft coaxially disposed with said output shaft; an epicyclic gear unit for said tractor disposed between said output shaft and said transmission shaft comprising, a first extension shaft detachably secured to said output shaft, a sungear secured to said extension shaft, an annular gear rotatably mounted on said extension shaft and having a brake surface, a planet-carrier rotatably mounted on said extension shaft and having planet gears rotatably secured thereto for operative engagement with said annular gear and said sungear, clutch means for selectively engaging said transmission shaft with said first extension shaft or with said carrier, brake means adapted to be engageable with said brake surface, hydraulic actuator means for operating said brake means, pump means for said hydraulic actuator in fluid communication therewith, mechanism driven by rotation of said layshaft for imparting a suction stroke to said pump and having resilient means for supplying a pumping stroke to said pump, control means for placing said mechanism in an operative or inoperative position.

7. In combination with a tractor having a change-speed gear casing with an output shaft and a layshaft extending rearwardly therefrom, and also having a differential casing with a transmission shaft extending forwardly therein, the improvement comprising; an epicyclic gear unit casing secured between said casings and operatively connecting them together, an epicyclic gear unit mounted within said unit casing and adapted to detachably engage said output shaft, clutch means supported in said unit for selectively engaging said transmission shaft with said gear unit or directly with said output shaft, brake means engageable with said gear unit, hydraulic actuator means for operating said brake means, pump means for said hydraulic actuator in fluid communication therewith, mechanism driven by rotation of said layshaft for imparting a suction stroke to said pump and having resilient means for supplying a pumping stroke to said pump, control means for placing said mechanism in an operative or inoperative position.

8. In a hydraulic actuator for an epicyclic gear unit having a brake, the combination comprising, a hydraulic piston and cylinder assembly coupled to said brake for operating the same when hydraulic pressure is supplied to said cylinder, a pump in fluid communication with said cylinder, said pump having a pumping member movable in a pumping stroke and in a suction stroke, said member being biased by resilient means in the direction of its pumping stroke, a power driven cam for intermittently moving said member in its suction stroke so as to alternately store energy in said resilient means and allow said means to move said member in its pumping stroke, and an adjustable control for selectively releasing the force of said resilient means from said member so as to interrupt operation of said pump when desired.

9. In a tractor having a brake-operated epicyclic gear unit operatively interposed between change-speed gearing in a transmission and wheel-driving differential gearing, a hydraulic actuator for said brake comprising, in combination, a hydraulic piston and cylinder assembly coupled to said brake for operating the same when hydraulic pressure is supplied to said cylinder, a pump in fluid communication with said cylinder, said pump having a pumping member movable in a pumping stroke and in a suction stroke, said member being biased by resilient means in the direction of its pumping stroke, a power driven cam for intermittently moving said member in its suction stroke so as to alternately store energy in said resilient means and allow said means to move said member in its pumping stroke, and an adjustable control for selectively releasing the force of said resilient means from said member so as to interrupt operation of said pump when desired.

References Cited in the file of this patent

UNITED STATES PATENTS

| | | |
|---|---|---|
| 730,066 | Wilson | June 2, 1903 |
| 2,528,653 | Hodquist | Nov. 7, 1950 |
| 2,637,217 | Taylor | May 5, 1953 |
| 2,655,009 | Johnson | Oct. 13, 1953 |
| 2,685,840 | Funston | Aug. 10, 1954 |

FOREIGN PATENTS

| | | |
|---|---|---|
| 700,995 | Great Britain | Dec. 16, 1953 |